(No Model.) 2 Sheets—Sheet 1.
A. WILFERT.
HARROW.
No. 473,041. Patented Apr. 19, 1892.
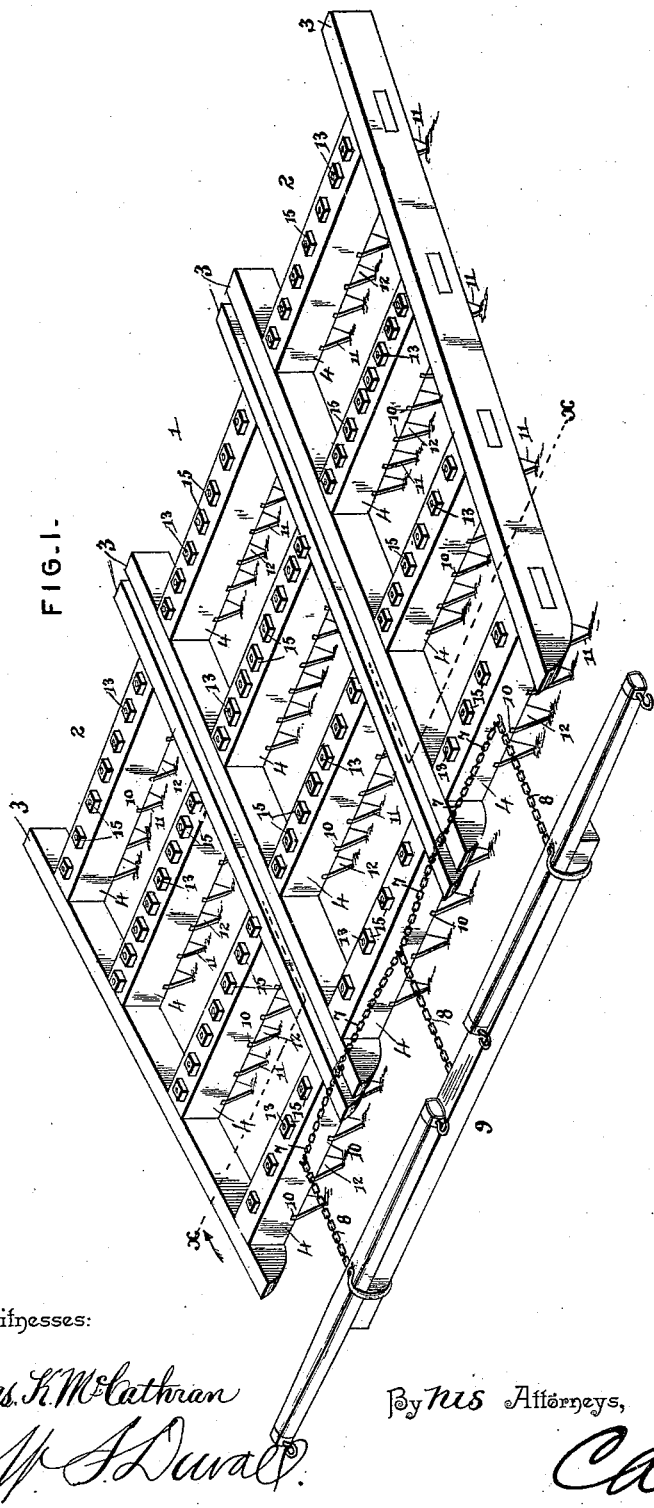
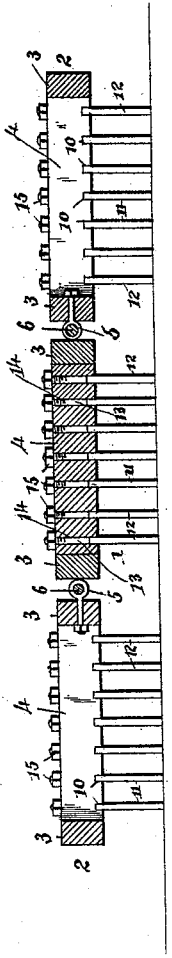
Witnesses:
Jas. K. McCathran
W. S. Duvall
Inventor
Andreas Wilfert
By his Attorneys,
C. A. Snow & Co.

(No Model.) 2 Sheets—Sheet 2.

A. WILFERT.
HARROW.

No. 473,041. Patented Apr. 19, 1892.

Witnesses
Jas. K. McCathran
W. J. Duvall

Inventor
Andreas Wilfert
By his Attorneys,
C. A. Snow & Co.

UNITED STATES PATENT OFFICE.

ANDREAS WILFERT, OF FABACHER, LOUISIANA.

HARROW.

SPECIFICATION forming part of Letters Patent No. 473,041, dated April 19, 1892.

Application filed August 7, 1891. Serial No. 402,030. (No model.)

*To all whom it may concern:*

Be it known that I, ANDREAS WILFERT, a citizen of the United States, residing at Fabacher, in the parish of Acadia and State of Louisiana, have invented a new and useful Harrow, of which the following is a specification.

This invention relates to improvements in harrows; and the objects in view are to provide a harrow of cheap and simple construction adapted to most thoroughly harrow or pulverize the soil, that will thoroughly cover the grain and level the ground, and will not turn the ground after the weeds have been plowed under, and, furthermore, to adapt the harrow-sections for use as single harrows for the purpose of cultivating cotton, corn, &c., and other crops planted in rows.

Various other objects and advantages of the invention will appear in the following description, and the novel features thereof will be particularly pointed out in the claims.

Figure 3:
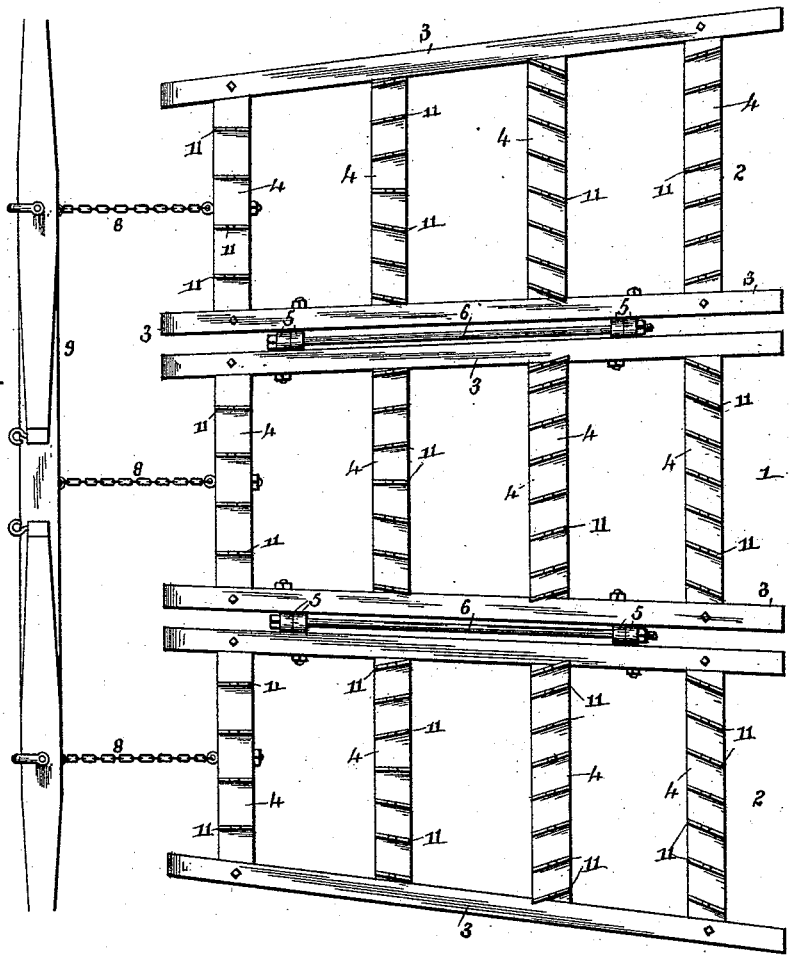
Figure 4:
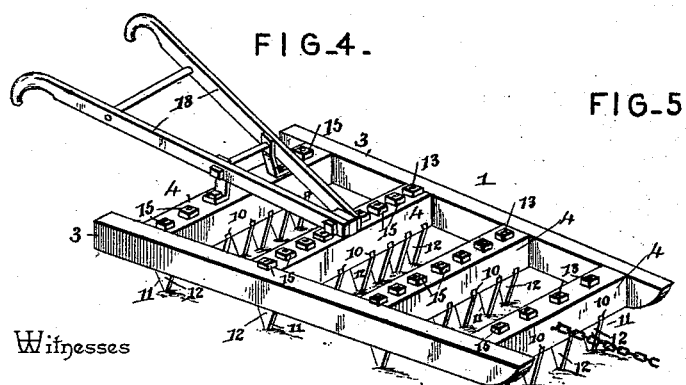
Figure 5:
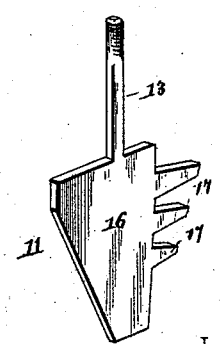

Referring to the drawings, Figure 1 is a perspective view of a harrow constructed in accordance with my invention. Fig. 2 is a transverse section on the line *x x* of Fig. 1. Fig. 3 is an inverted plan view. Fig. 4 is a detail in perspective of the central harrow-section, the same being adapted for use as a cultivator. Fig. 5 is a perspective of a preferred form of tooth.

Like numerals of reference indicate like parts in all the figures of the drawings.

In practicing my invention I employ a main or central section 1, and to the outer sides of the same removably hinge in a manner hereinafter specified side sections or wings 2. Each section comprises a pair of longitudinal side bars 3 and a series of transverse harrow-bars 4, the longitudinal side bars of the central section being preferably slightly converged. Pairs of eyes 5 are located upon the side bars of each section, those of one section aligning with those of an adjacent section and being pivotally connected by means of removable pintle-rods 6. By removing the rods it will be seen that the harrow-sections are entirely separated and may be used independently of each other. Chains 7 removably connect the front ends of the sections, and a short chain 8 leads from the front end of each section and at its front end is connected with a single or double tree 9, to which the draft-animals may be attached. The under sides of the harrow-bars are provided with a series of kerfs 10, those of the first bar being preferably arranged straight or transverse the bar and those of the remaining bars being arranged in alternate directions, so as to present a zigzag series of teeth.

11 designates the teeth, each of which consists of a triangular or V-shaped blade 12, the opposite converging edges of which are beveled, and above said blades the tooth is reduced to form a shank 13, which passes upwardly through an opening 14, formed coincident with the tooth-seats. The shank is threaded and has mounted thereon for the purpose of drawing the base of the tooth in the tooth-seat a clamping or binding nut 15.

In Fig. 5 I have illustrated my preferred form of tooth, and the same consists simply in the blade 16, which is triangular in shape and at its rear edge is provided with a series of fingers 17. By inclining the blades as shown and described and graduating their numbers—that is, increasing them upon each succeeding harrow-bar—it is impossible for the harrow to pass over any clods without thoroughly pulverizing or cutting the same. By the provision of the fingers at the rear edges of the blades the pulverization of the clods is facilitated. As shown in Fig. 4, the sections may be disconnected and the central section provided with a pair of cultivator-handles 18, by which the harrow may be converted into a cultivator of great efficiency. By removing one of the sections the harrow is adapted for cultivating between rows, as is usual.

From the foregoing description it will be seen that I provide a harrow adapted to be used for all the various purposes for which a harrow is applicable and for use as a cultivator, and that the said harrow is of even draft, light, durable, and very efficient, such efficiency being the result of the peculiar disposition given to the harrow-teeth and their relative arrangement and also the peculiar shape of tooth.

It will be obvious that I may substitute for the tooth herein described as that of my preferred form the tooth having opposite converging beveled plain cutting-edges. Such a tooth can be reversed, and thus the necessity of sharpening reduced. I, however, prefer the tooth having the fingers, as said fingers greatly aid in pulverizing the soil.

I do not wish to limit myself to the use of the chain 7. In some cases I may use the shanks of the teeth as a means for securing the bars where they are mortised together. In some cases only two sections may be employed instead of three, as shown.

Having described my invention, what I claim is—

1. A harrow-section comprising a series of transverse harrow-bars, each of which is provided with a series of substantially V-shaped teeth, the rear edges of which are provided with fingers, substantially as specified.

2. A harrow-section comprising a series of transverse harrow-bars, each of which is provided with a series of substantially V-shaped teeth having a series of fingers at their rear edges, the teeth of one bar being arranged at an angle to those of the adjacent bars, substantially as specified.

3. In a harrow, a series of harrow-bars and a series of V-shaped teeth disposed at an angle to each other, the teeth of the bars being increased in number toward the rear bar, substantially as specified.

In testimony that I claim the foregoing as my own I have hereto affixed my signature in presence of two witnesses.

ANDREAS WILFERT.

Witnesses:
ZENO HUBER,
JAMES LITTLE.